US007769693B2

(12) United States Patent
Patel et al.

(10) Patent No.: US 7,769,693 B2
(45) Date of Patent: Aug. 3, 2010

(54) MECHANISM FOR SECURE REHOSTING OF LICENSES

(75) Inventors: Anand Patel, San Jose, CA (US); Andrew G. Harvey, Pleasanton, CA (US); Anand Pandharikar, Santa Clara, CA (US); Balachander Chandrasekaran, San Ramon, CA (US); Vikram Sharma, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 426 days.

(21) Appl. No.: 11/731,419

(22) Filed: Mar. 30, 2007

(65) Prior Publication Data

US 2008/0243683 A1    Oct. 2, 2008

(51) Int. Cl.
    *G06F 21/00*    (2006.01)
(52) U.S. Cl. ........................................... 705/59
(58) Field of Classification Search .................. 705/59
    See application file for complete search history.

(56) References Cited

U.S. PATENT DOCUMENTS

| 2002/0107809 | A1* | 8/2002  | Biddle et al. .................. 705/59 |
| 2003/0014652 | A1  | 1/2003  | Nakayama |
| 2005/0289072 | A1  | 12/2005 | Sabharwal |
| 2007/0207852 | A1* | 9/2007  | Nelson et al. ................. 463/24 |

OTHER PUBLICATIONS

International Search Report and Written Opinion mailed Aug. 8, 2008 from corresponding PCT Application No. PCT/US08/58533 (Ref. No. F-669790C-PC/Scientific Atlanta).
Williams, Robert, "Is Your Software Up To Date? Vendor's Web should tell" http://www.machinedesign.com/ASP/viewSelectedArticle.asp?strArticleId=56886&strSite=MDSite&catId=0 downloaded from the internet on Mar. 27, 2007, 3 pp.
Apple's iTunes enables a user to obtain up to 5 licenses via Apple's web site. http://www.itunes.com, Downloaded from the internet on Apr. 16, 2007, 2 pages.
http://www.apple.com , Downloaded from the internet on Apr. 16, 2007, 2 pages.

* cited by examiner

*Primary Examiner*—Pierre E Elisca
(74) *Attorney, Agent, or Firm*—Hickman Palermo Truong & Becker LLP

(57) ABSTRACT

In one embodiment, a licensing authority receives a rehost ticket indicating proof of removal of a license from a first device. The licensing authority receives a request for a license for a second device. The licensing authority validates the rehost ticket to ensure that the license on the first device has been removed from the first device. The licensing authority provides a license for the second device if the rehost ticket is successfully validated, wherein the license that has been removed from the first device and the license for the second device provide the same license capabilities. The first device and the second device are associated with the same customer. Payment has been received for the license associated with the first device but payment has not been received for a separate license capable of being applied to the second device.

28 Claims, 8 Drawing Sheets

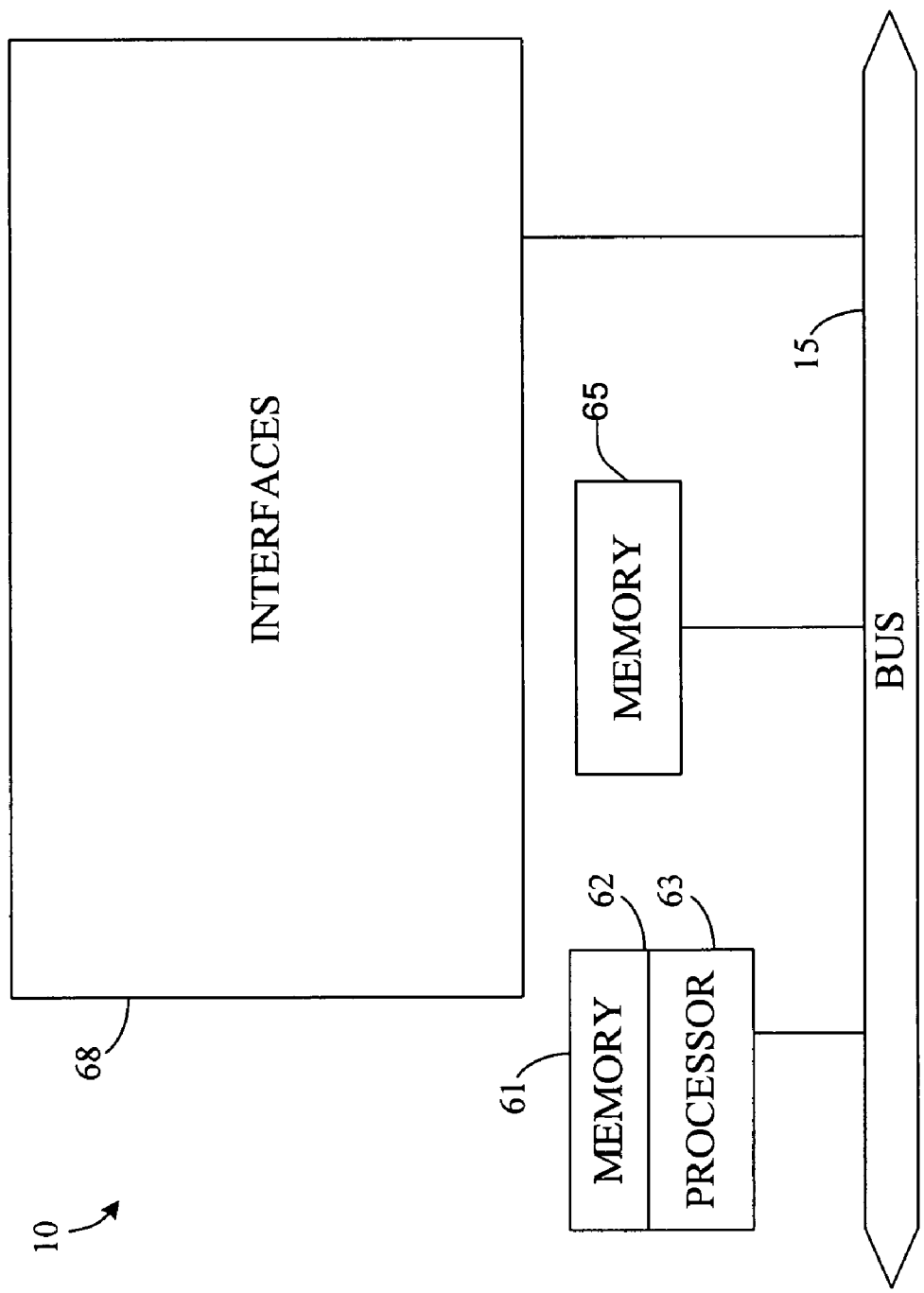

MECHANISM FOR SECURE REHOSTING OF LICENSES

BACKGROUND

1. Technical Field

The present disclosure relates generally to technology supporting rehosting of licenses.

2. Description of the Related Art

Many companies sell software to customers. When software is sold to a customer, a license for the use of the software is typically provided to the customer. However, after installing the software on one device, the customer may wish to move the licensed software (and therefore the license) to another device.

Generally, licensing is trust-based. Upon receiving a request from the customer, companies typically provide the customer an additional license. More particularly, many companies provide the customer a maximum of one additional license per year, and they trust that the customer will remove the previously issued license from the previous machine. In this manner, companies limit their losses in revenue to the price of one license per year if the customer does not remove the license from the previous machine.

BRIEF DESCRIPTION OF THE DRAWINGS

FIG. 6 is a block diagram illustrating an example general-purpose computer system suitable for implementing the disclosed embodiments.

DESCRIPTION OF EXAMPLE EMBODIMENTS

Figure 1:
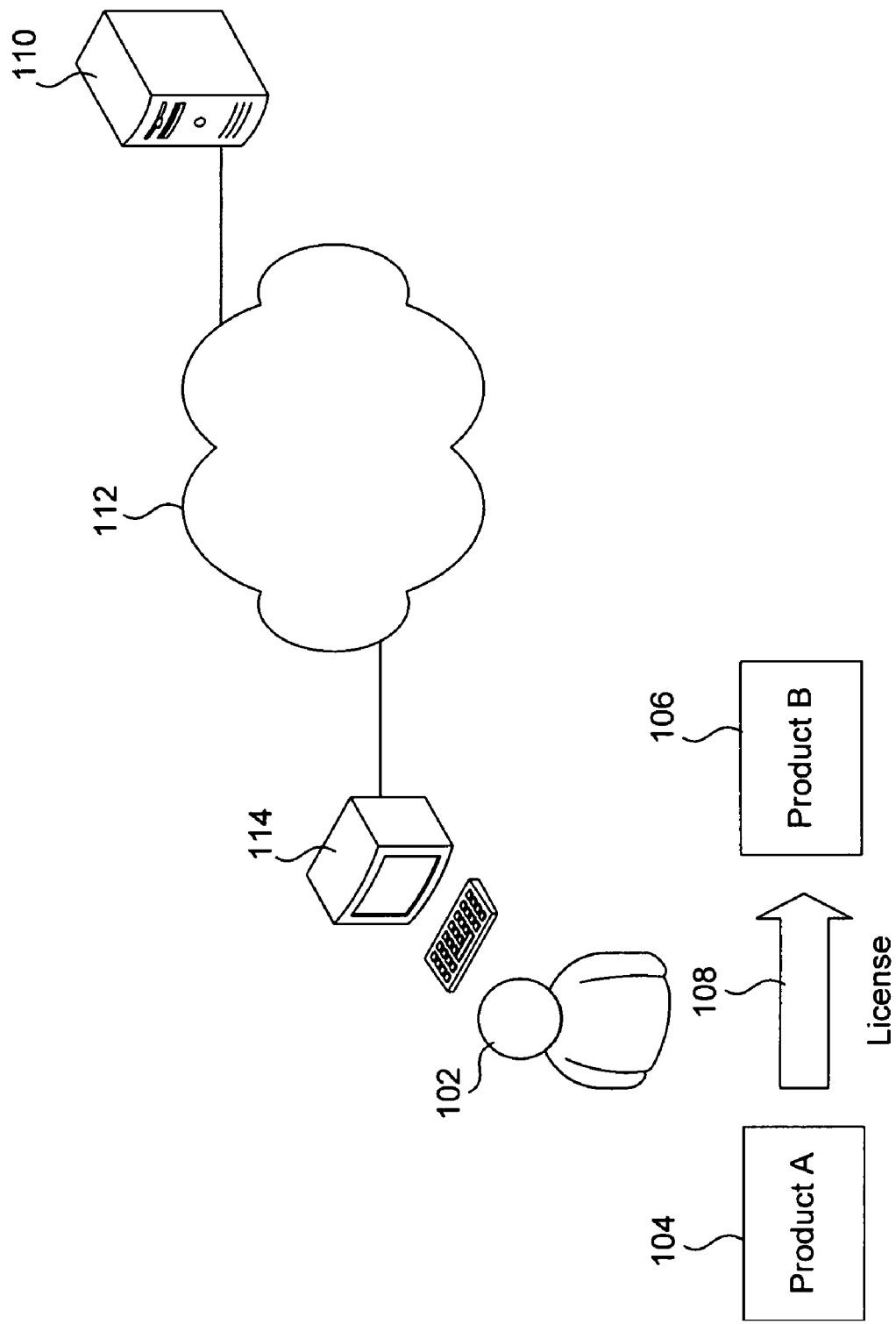
FIG. 1 is a block diagram illustrating an example system in which secure re-hosting of a license may be implemented.

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In one embodiment, a licensing authority receives a rehost ticket indicating proof of removal of a license from a first device. The licensing authority receives a request for a license for a second device. The licensing authority validates the rehost ticket to ensure that the license on the first device has been removed from the first device. The licensing authority provides a license for the second device if the rehost ticket is successfully validated, wherein the license that has been removed from the first device and the license for the second device provide the same license capabilities. The first device and the second device are associated with the same customer. Payment has been received for the license associated with the first device but payment has not been received for a separate license capable of being applied to the second device.

Specific Example Embodiments

Many companies sell products including hardware and/or software to customers. In addition, these companies often act as licensing authorities to provide licenses for the hardware and/or software that is sold.

In the following description, the terms "customer" and user" are used. While a customer may refer to an individual (or company) who has previously purchased a product and/or a corresponding license from a licensing authority, a user may refer to an individual who is in possession of the product and corresponding license. The customer may be the user. However, it is important to note that the customer need not be the same entity as the user. For instance, a company may act as a customer to purchase a product and/or license for use by a separate user within the company.

A user who already has a license often wants to "rehost" a license. Rehosting generally refers to the movement of a first license from a first device to a second device. In order to rehost a license, the user typically speaks with an operator associated with the licensing authority, who then issues a second license (e.g., license token) for the second device. When the user installs the second license on the second device, capabilities enabled by the second license may be "unlocked." Unfortunately, when a user submits a request to rehost a license, licensing authorities typically cannot determine whether the user has revoked the first license from the first device.

The disclosed embodiments enable licensing authorities to obtain proof that a license has been revoked for one device before enabling the license to be rehosted on another device. In this manner, companies may eliminate losses in revenues that are typically associated with rehosting.

FIG. 1 is a block diagram illustrating an example system in which secure re-hosting of a license may be implemented. As shown in FIG. 1, a user 102 may be in possession of two different devices, device A 104 and device B 106. Typically, each device has a device identifier, such as a Media Access Control (MAC) address. Often, users may obtain a license for fewer devices than the number of devices in the user's possession. In this example, the user 102 has obtained a single license from a licensing authority, but is in possession of two devices. The user 102 may have a license that has been obtained and installed on a first device, such as device A 104. However, the user 102 may want to "move" the license from the first device to a second device, such as device A 104. In other words, after the licensing authority has received payment for the license that is installed on the first device, device A 104, the user may wish to apply the license to the second device, device B 106, without paying for a separate license capable of being applied to the second device, device B 106.

The movement of the license between the two devices is shown at 108. It is important to note that the movement of the license need not include a physical transfer of a license or corresponding data structure from the first device, device A 104, to the second device, device B 106. Rather, the license that has been removed from the first device and the license for the second device may simply provide the same license capabilities (e.g., features or functionality). However, the two licenses may differ according to the unique device identifiers associated with the two devices.

In order to ensure that the license that the user 102 would like to install on device B 106 has been removed from device A 104, the user 102 may provide proof to the licensing authority that the license has been removed from device A. More particularly, the user 102 may contact a web site, shown here as server 110, maintained by or associated with the licensing authority via a network 112 such as the Internet.

The user 102 need not contact the web site via the first device, device A 104, or the second device, device B 106. In this example, the user 102 contacts the web site, represented by the server 110, via another device, shown at 112. Each device may be any device including a processor and a memory, such as a personal computer or portable computer. The user 102 may connect to the web site via a wired or wireless connection to the network 112. It is also important to note that the user may submit some or all information via another mechanism (not shown), such as email or phone.

Figure 2A:
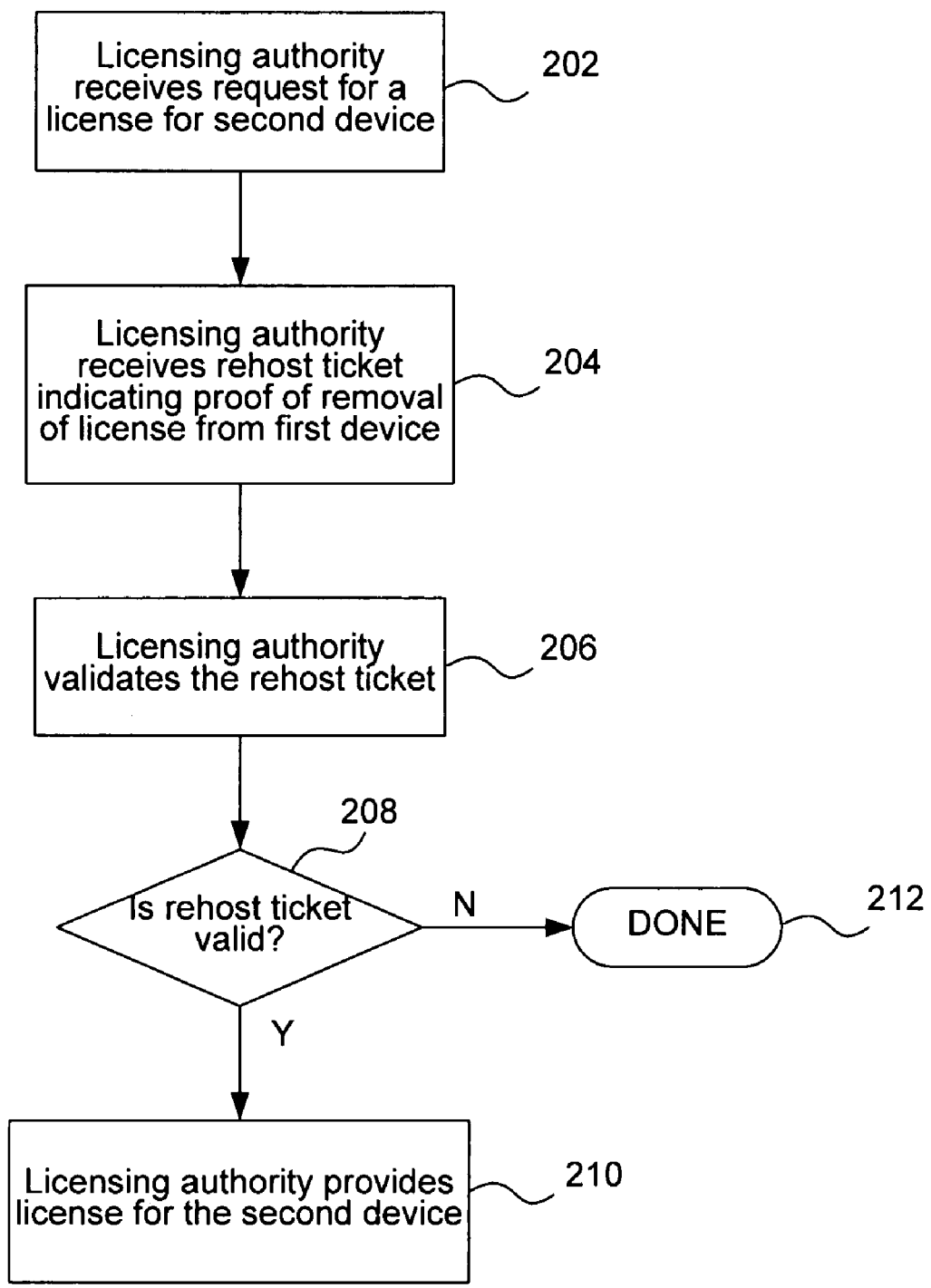
FIG. 2A is a process flow diagram illustrating an example method of performing secure re-hosting of a license by a licensing authority.

FIG. 2A is a process flow diagram illustrating an example method of performing secure re-hosting of a license by a licensing authority. As shown in FIG. 2A, the licensing authority may receive a request for a license for a second device associated with a customer of the licensing authority at 202. Upon receiving a rehost ticket indicating proof of removal of a license from a first device associated with the customer of the licensing authority at 204, the licensing authority validates the rehost ticket at 206 to ensure that the license has been removed from the first device. If the rehost ticket is successfully validated at 208, the licensing authority may provide a license for the second device at 210. However, if the rehost ticket is not successfully validated at 208, the process may end at 212.

Figure 2B:
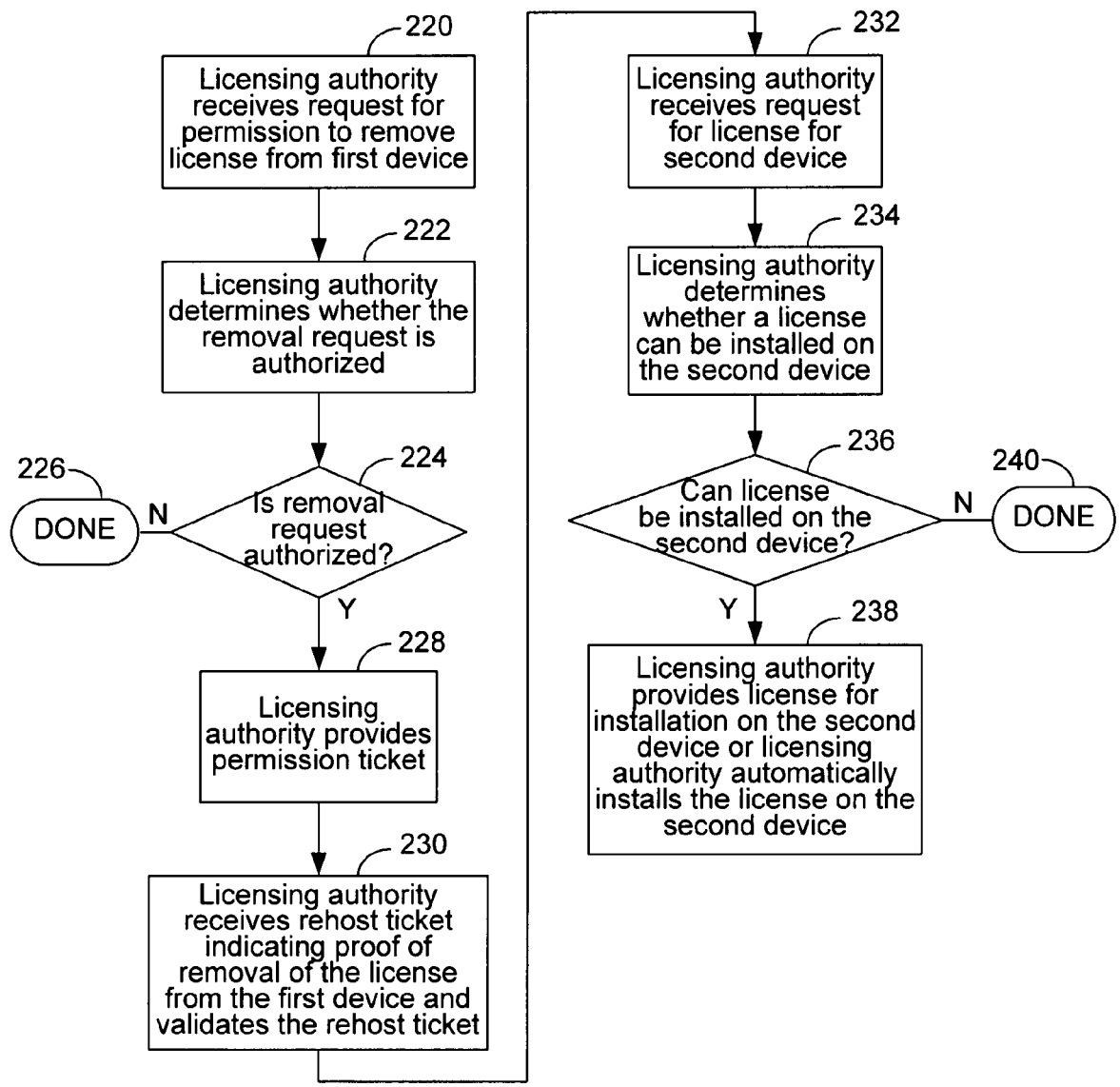
FIG. 2B is a process flow diagram illustrating an example method of performing secure re-hosting of a license by a licensing authority in response to a first request to remove a license from a first device and a second request for a license for a second device.

FIG. 2B is a process flow diagram illustrating an example method of performing secure re-hosting of a license by a licensing authority in response to a first request to remove a license from a first device and a second request for a license for a second device. In some embodiments, the licensing authority may receive a request for permission to remove the license from the first device as shown at 220. The licensing authority may receive such a request, for example, via a web site, email, or phone. In such a request, the user may provide proof of possession of the first device (or proof of possession of the license that has previously been issued and installed on the first device) to the licensing authority.

The user may also provide an identifier associated with the customer who has previously purchased the license. If the user is in possession of more than one product license from the licensing authority, the user may identify the license and/or product in order to indicate the capabilities associated with the license. The licensing authority may determine at 222 whether the removal request is authorized. For instance, the licensing authority may ascertain whether the proof of possession is valid and/or whether the customer has previously purchased the license from the licensing authority.

If the removal request is not authorized at 224, the process may end at 226. However, if the removal request is authorized at 224, the licensing authority may provide a permission ticket to be applied to the first device at 228, enabling the license to be removed from the first device. For instance, the licensing authority may provide the permission ticket to the user via a web site, email, or phone. The permission ticket may be embodied in a variety of formats and/or data structures. For instance, the permission ticket may be a string including alphanumeric characters and/or other symbols.

The licensing authority may receive a rehost ticket indicating proof of removal of the license from the first device via a variety of mechanisms, such as a web site, email, or phone. Upon receiving the rehost ticket, the licensing authority may validate the rehost ticket at 230. The rehost ticket may be embodied in a variety of formats and/or data structures. For instance, the rehost ticket may be a string including alphanumeric characters and/or other symbols.

The licensing authority may also receive a request for a license for the second device at 232. For instance, the licensing authority may receive the request from a user via a web site, email, or phone. The request for the license for the second device may identify the second device and/or the customer. Moreover, if the user is in possession of more than one product license from the licensing authority, the user may identify the license (or provide proof of possession of the license) that was previously installed on the first device and/or indicate the product (or product type) of the second device in order to indicate the capabilities associated with the license that is being requested. The licensing authority may determine whether a license and/or corresponding software may be installed on the second device at 234. As one example, the licensing authority may determine whether to provide a license for the second device based upon one or more business policies. For instance, the licensing authority may ascertain whether the license capabilities (e.g., software features) associated with the first license may be supported on a product type of the second device. e.g. low-end routers. Moreover, the licensing authority may ascertain a license type of the license that has been previously issued and installed on the first device. For instance, a license may be a grace license, a temporary license, or a license for usage of certain video protocols. The licensing authority may then determine whether the license type can be rehosted. For instance, it may be undesirable to enable a grace license or temporary license to be rehosted.

If the licensing authority determines that the requested license can be installed on the second device at 236, the licensing authority may provide a license for installation on the second device at 238. For instance, the licensing authority may provide a key or ticket to be submitted to the second device to "unlock" features associated with the license. As another example, the licensing authority may provide a license via a web site or email. Alternatively, the licensing authority may automatically install the license on the second device. If the licensing authority determines that a license cannot be installed on the second device at 236, the process may end at 240.

Figure 2C:
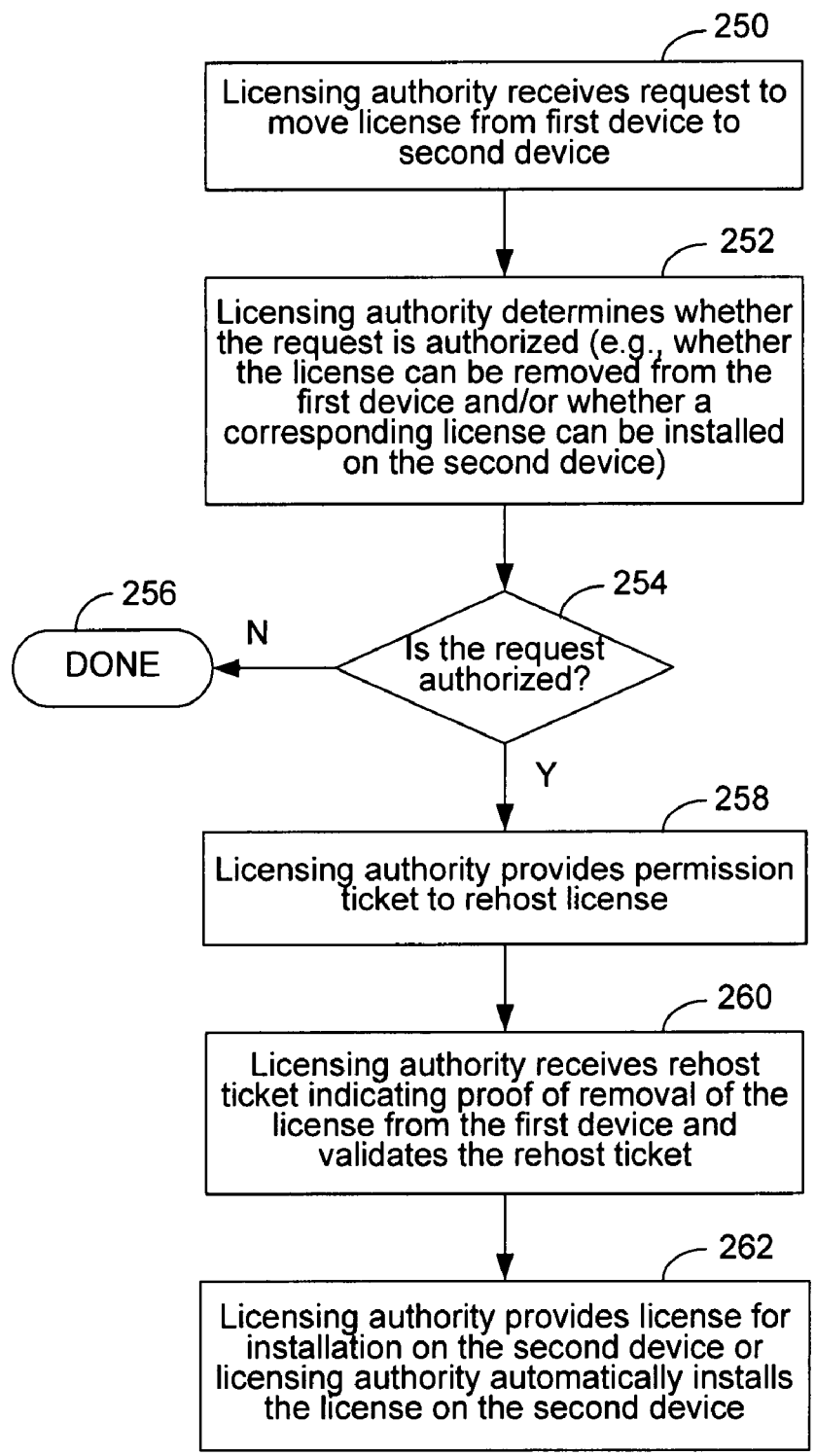
FIG. 2C is a process flow diagram illustrating an example method of performing secure re-hosting of a license by a licensing authority in response to a request to move a license from a first device to a second device.

In some embodiments, the licensing authority may receive a single request to move a license from the first device to the second device, rather than both a request for permission to remove a license from the first device and a request for a license for the second device. FIG. 2C is a process flow diagram illustrating an example method of performing secure re-hosting of a license by a licensing authority in response to a request to move a license from a first device to a second device. As shown in this example, the licensing authority may receive a request to move the license from the first device to the second device at 250. Such a request may identify the first device and the second device. The request may also identify the license being "moved" and/or the customer. The licensing authority may determine whether the request is authorized at 252. More particularly, the licensing authority may determine whether the license can be removed from the first device and/or whether a corresponding license can be installed on the second device, as set forth above. If the request is not authorized at 254, the process may end at 256. However, if the request is authorized at 254, the licensing authority may provide a permission ticket at 258 in order enable the license to be rehosted. More particularly, the permission ticket may enable the license to be revoked from the first device, as will be described in further detail below.

When the licensing authority receives a rehost ticket indicating proof of removal of the license from the first device, the licensing authority may validate the rehost ticket at 260. Assuming that the rehost ticket has been successfully validated, the licensing authority may provide a license for installation on the second device or the licensing authority may automatically install the license on the second device (e.g., via a web site) at 262.

Figure 3:
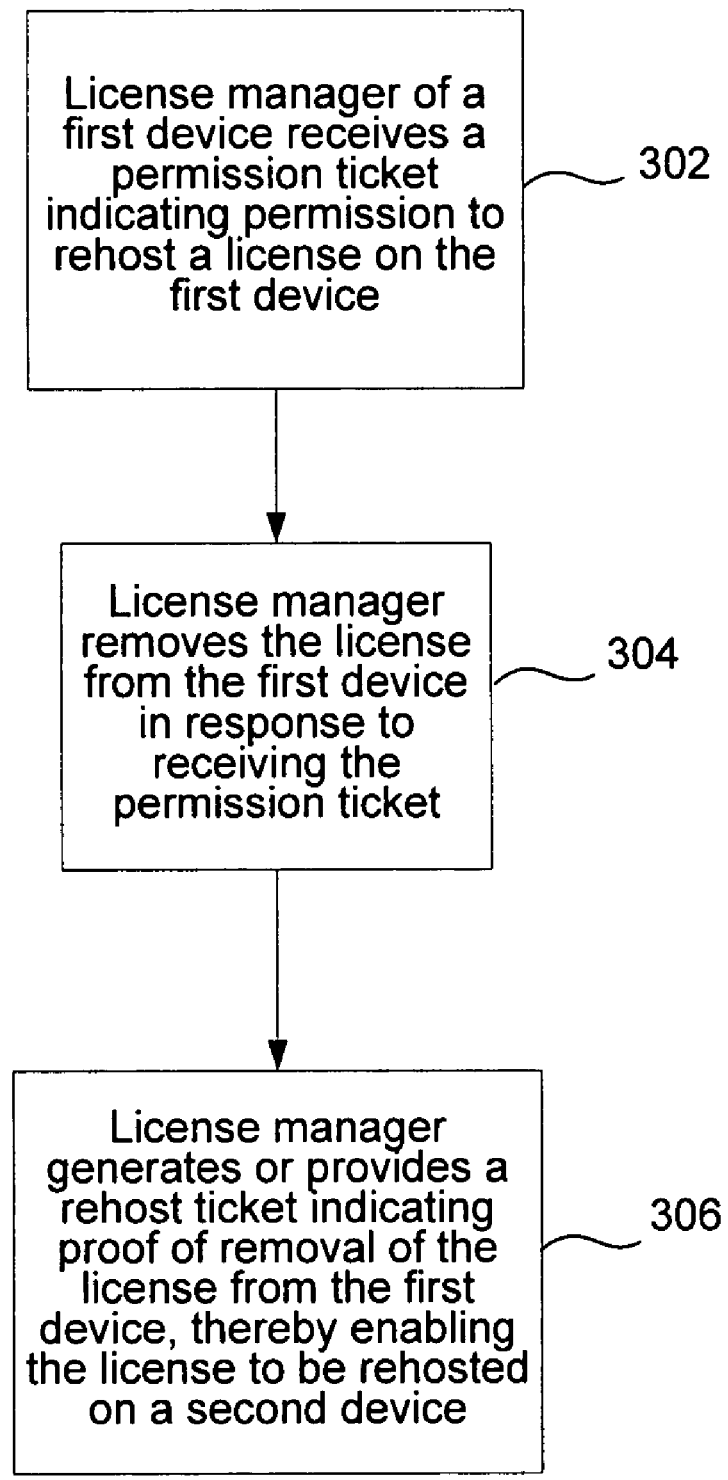
FIG. 3 is a process flow diagram illustrating an example method of implementing a license manager to ensure that a license is removed from a first device prior to rehosting the license on a second device.

A product with which a license is associated may include a license manager. FIG. 3 is a process flow diagram illustrating an example method of implementing a license manager to ensure that a license is removed prior to rehosting the license. In one embodiment, when a user receives a permission ticket indicating that the licensing authority has granted permission to revoke the license on a first device, the user may provide the permission ticket to the license manager of the first device (e.g., via a command line interface or other user interface). Upon receiving the permission ticket at 302 and validating the permission ticket, the license manager may remove (i.e., revoke) the license from the first device at 304. Upon completion of removal of the license from the first device, the license manager may generate and/or provide a rehost ticket at 306. The user may then provide the rehost ticket to the licensing authority as proof of removal of the license from the first device, thereby enabling the license to be rehosted on a second device.

Figure 4:
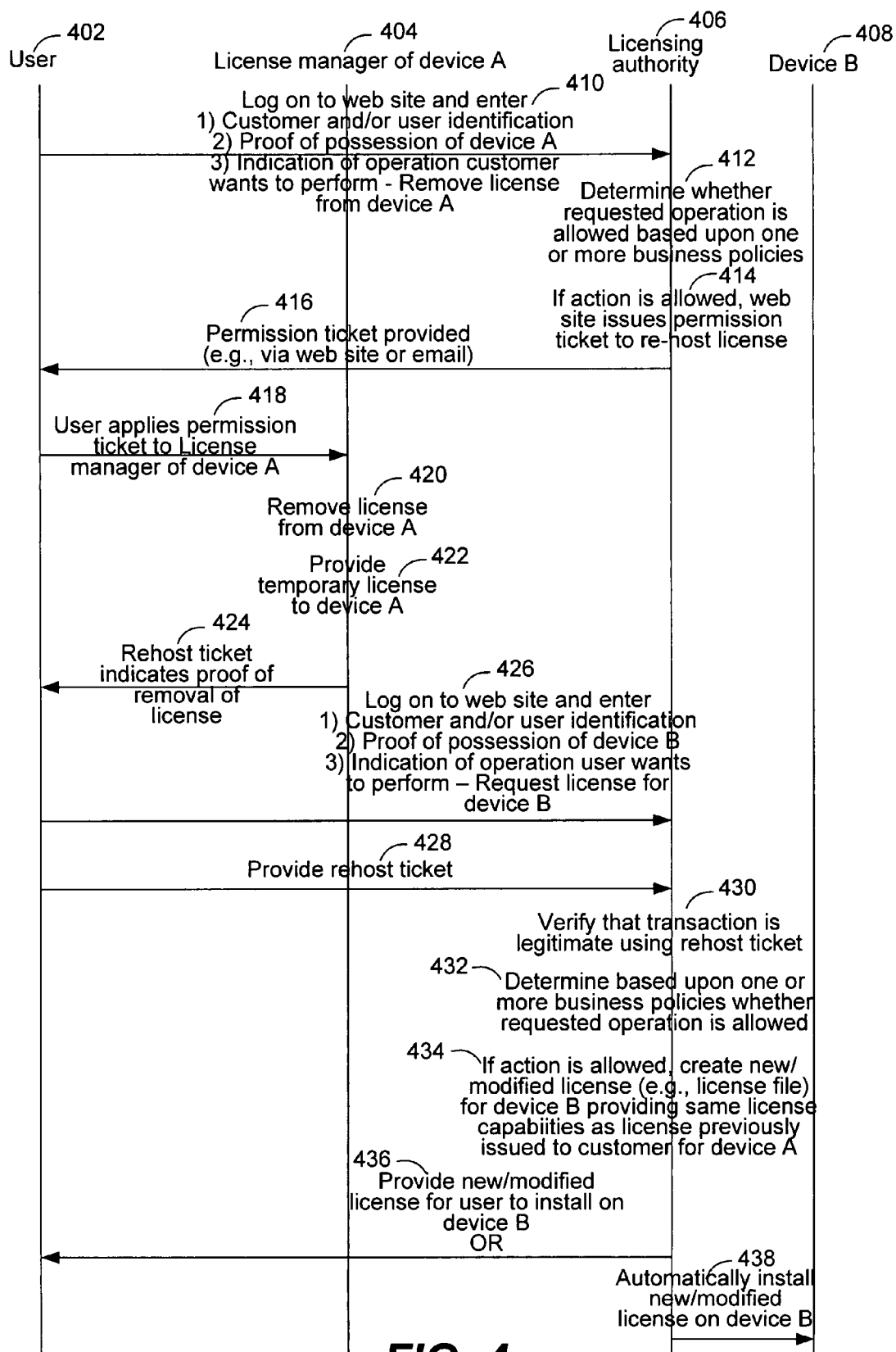
FIG. 4 is a transaction flow diagram illustrating an example method of performing secure re-hosting of a license in response to a request to remove a license from a first device and a subsequent request for a license for a second device.

FIG. 4 is a transaction flow diagram illustrating an example method of performing secure re-hosting of a license in response to a request to remove a license from a first device and a subsequent request for a license for a second device. Steps performed by a user, a license manager of device A, a licensing authority, and device B will be described with reference to vertical lines 402, 404, 406, and 408, respectively. The user may submit a customer identifier (e.g., customer number) and/or user identifier (e.g., email address), a license identifier, an indication (e.g., request) of the operation the user would like to perform, and/or proof of possession of the device associated with the requested operation to the licensing authority at 410. For instance, the user may submit this information via a web site associated with the licensing authority (e.g., upon logging on to a web site associated with the licensing authority). In this example, the requested operation is the removal of the license from the first device, device A. As a result, the user may submit proof of possession of device A. Proof of possession may include, for example, a unique device identifier such as a MAC address.

The licensing authority may then determine whether the requested operation is allowed based upon one or more business policies at 412. For instance, the licensing authority may determine whether the usercustomer, and/or license has been successfully identified or authenticated. If the requested operation is allowed, the licensing authority may issue a permission ticket at 414. The licensing authority may then provide the permission ticket, for example, via the web site, via email, or phone at 416.

Upon receiving the permission ticket, the user may apply the permission ticket to the license manager of device A at 418. More particularly, the user may submit the permission ticket via a user interface such that the license manager receives the permission ticket. The license manager may process (e.g., validate) the permission ticket. Assuming that the permission ticket is valid, the license manager may remove the license from device A at 420. For instance, the license manager may remove or otherwise revoke the license.

In one embodiment, a license file enables capabilities associated with the product that to be turned on and/or off. Thus, the license manager may remove the license from device A by removing the license file or modifying the license file to indicate that capabilities associated with the license are no longer enabled on the product (e.g., device A and/or software installed on device A).

Upon removing the license from device A, it may be desirable to provide a temporary license to device A. In one embodiment, the license manager may generate or otherwise provide a temporary license for device A at 422. In this manner, the user may obtain the benefits of the license during a period in which the license may not yet be rehosted on another device (e.g., device B). The license manager may automatically revoke the temporary license after a predetermined period of time or, alternatively, the license manager may revoke the temporary license after receiving an indication that a license having the same capabilities as the revoked license has been installed on another device.

The license manager of device A may generate or provide a rehost ticket indicating proof of removal of the license from device A to the user at 424. The user may then provide the rehost ticket to the licensing authority. In one embodiment, the user may log on to the web site associated with the licensing authority and enter a customer identifier (e.g., customer number) and/or user identifier (e.g., email address), proof of possession of the device on which the license is being rehosted (e.g., device B), a license identifier and/or an indication of the operation that the user would like to perform at 426. Proof of possession may include, for example, a unique device identifier such as a MAC address. In this example, the requested operation may indicate a request for a license for another device (e.g., device B). Thus, the user may also indicate the type of device B. The user may also provide at least a portion of this information via another mechanism, such as email or phone.

The user may also provide the rehost ticket to the licensing authority as proof that the license has been removed from device A. The rehost ticket may identify the license that has been removed from device A, the license type, the identity of device B (e.g., MAC address), the type of device B, and/or the customer associated with the license. In one embodiment, the user provides the rehost ticket to the licensing authority via a web site associated with the licensing authority as shown at 428. Of course, it is also possible that the user may provide this information via another communication medium, such as email or phone.

Upon receiving the information provided at steps 426 and/or 428, the licensing authority may verify that the transaction is legitimate at 430. For instance, the licensing authority may authenticate the user and/or customer, as well as the rehost ticket. Authentication of the rehost ticket may include cross-verifying a device identifier of device A (e.g., which may be encrypted) with the prior-sales record in a database of the licensing authority. In addition, the licensing authority may determine based upon one or more business policies whether the requested operation is allowed at 432. For instance, the licensing authority may determine whether the license type may be rehosted. The licensing authority may also determine whether the license may be installed on device B. For instance, the device type of device B may not support the capabilities associated with the license.

If the requested operation is allowed, the licensing authority may generate a license for device B and/or modify an existing license previously associated with device A at 434. For instance, the license may include or otherwise incorporate a device identifier (e.g., MAC address) associated with device B. The license may be embodied in a license file, which may enable capabilities to be turned on and off in the product (e.g., device B and/or software installed on device B). In this manner, the licensing authority may create a new or modified license for device B that provides the same license capabilities as the license previously issued to the customer for device A.

The licensing authority may then provide the new or modified license to the user to install on device B at 436. For instance, the licensing authority may provide a license identifier (e.g., key) to the user via a web site, email, or phone. Alternatively, the licensing authority may automatically install the new or modified license on device B at 438.

Figure 5:
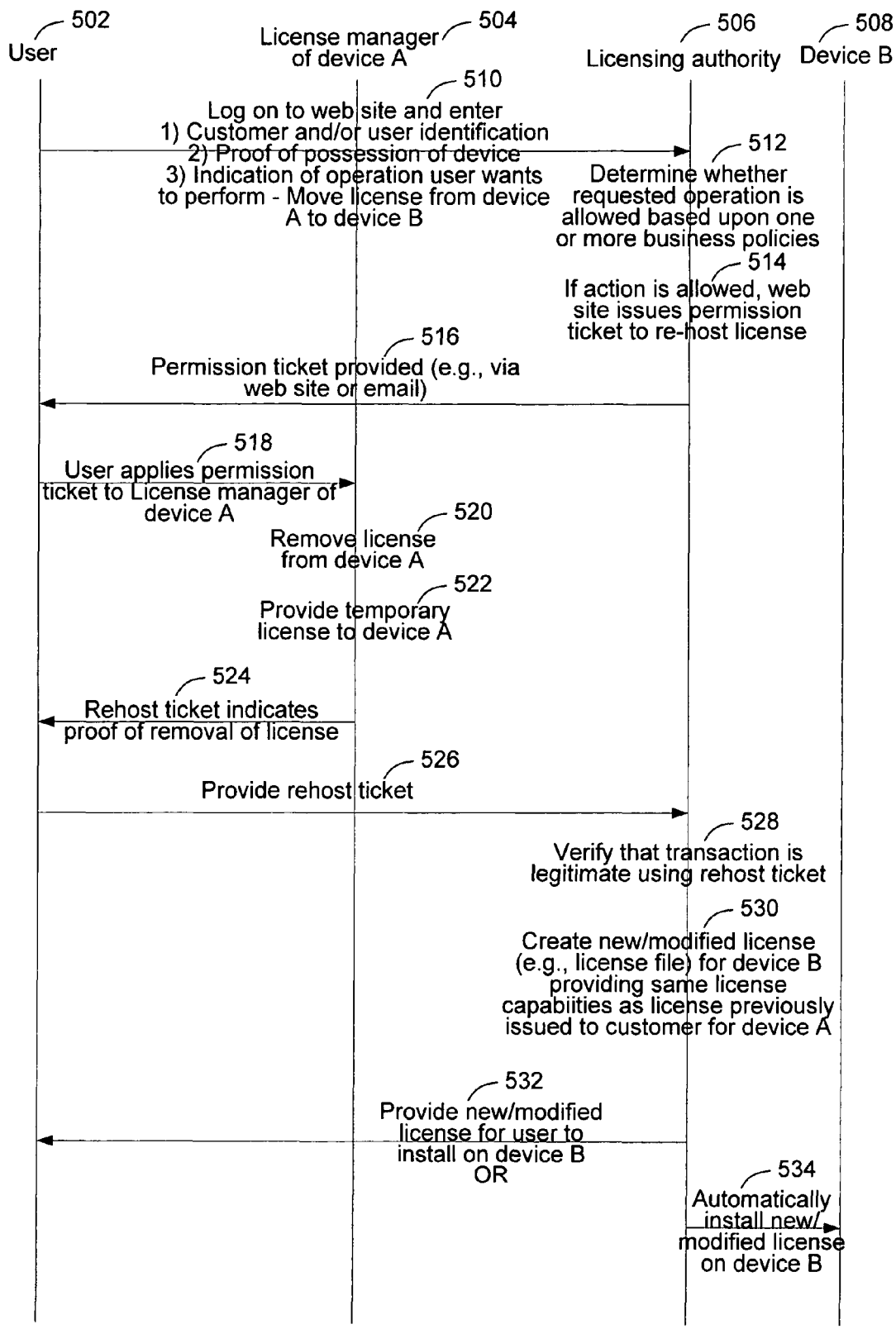
FIG. 5 is a transaction flow diagram illustrating an example method of performing secure re-hosting of a license in response to a request to move the license from a first device to a second device.

FIG. 5 is a transaction flow diagram illustrating an example method of performing secure re-hosting of a license in response to a request to move the license from a first device to a second device. Steps performed by a user, a license manager of device A, a licensing authority, and device B will be described with reference to vertical lines 502, 504, 506, and 508, respectively. The user may submit a customer identifier (e.g., customer number) and/or user identifier (e.g., email address), a license identifier, an indication (e.g., request) of the operation the user would like to perform, and/or proof of possession of the devices associated with the requested operation to the licensing authority at 510. The user may also indicate the type of device B. For instance, the user may submit this information via a web site associated with the licensing authority (e.g., upon logging on to a web site associated with the licensing authority). In this example, the requested operation is the "movement" of the license from the first device, device A, to the second device, device B. As a result, the user may submit proof of possession of both device A and device B. Proof of possession may include, for example, a unique device identifier such as a MAC address associated with both devices.

The licensing authority may then determine whether the requested operation is allowed based upon one or more business policies at 512. For instance, the licensing authority may determine whether the user, customer, and/or license has been successfully identified or authenticated. Moreover, the licensing authority may determine whether the license type may be rehosted. The licensing authority may also determine whether the license may be installed on device B. For instance, the device type of device B may not support the capabilities associated with the license. If the requested operation is allowed, the licensing authority may issue a permission ticket at 514. The licensing authority may then provide the permission ticket, for example, via the web site, via email, or phone at 516.

Upon receiving the permission ticket, the user may apply the permission ticket to the license manager of device A at 518. More particularly, the user may submit the permission ticket via a user interface such that the license manager receives the permission ticket. The license manager may process (e.g., validate) the permission ticket. Assuming that the permission ticket is valid, the license manager may remove the license from device A at 520. For instance, the license manager may remove or otherwise revoke the license. As one example, the license manager may remove the license from device A by removing the license file or modifying the license file to indicate that capabilities associated with the license are no longer enabled on the product (e.g., device A and/or software installed on device A).

Upon removing the license from device A, it may be desirable to provide a temporary license to device A. In one embodiment, the license manager may generate or otherwise provide a temporary license for device A at 522. In this manner, the user may obtain the benefits of the license during a period in which the license may not yet be rehosted on another device (e.g., device B). The license manager may automatically revoke the temporary license after a predetermined period of time or, alternatively, the license manager may revoke the temporary license after receiving an indication that a license having the same capabilities as the revoked license has been installed on another device.

The license manager of device A may provide a rehost ticket indicating proof of removal of the license from device A to the user at 524. The user may also provide the rehost ticket to the licensing authority as proof that the license has been removed from device A at 526. The rehost ticket may identify the license that has been removed from device A, the license type, the identity of device B (e.g., MAC address), the type of device B, and/or the customer associated with the license. In one embodiment, the user provides the rehost ticket to the licensing authority via a web site associated with the licensing authority. In this example, the user has already logged onto the web site associated with the licensing authority and continues to submit information during a single session, as shown in FIG. 4. However, the user may also choose to submit the rehost ticket during a different session. Of course, it is also possible that the user may provide this information via another communication medium, such as email or phone.

Upon receiving the information provided at step 526, the licensing authority may verify that the transaction is legitimate at 528. For instance, the licensing authority may authenticate the user and/or customer, as well as the rehost ticket. If the transaction is legitimate, the licensing authority may generate a license for device B and/or modify an existing license previously associated with device A at 530. For instance, the new or modified license may include or otherwise incorporate a device identifier (e.g., MAC address) associated with device B. The license may be embodied in a license file, which may enable capabilities to be turned on and off in the product (e.g., device B and/or software installed on device B). In this manner, the licensing authority may create a new or modified license for device B that provides the same license capabilities as the license previously issued to the customer for device A.

The licensing authority may then provide the new or modified license to the user to install on device B at 532. For instance, the licensing authority may provide a license identifier (e.g., key) to the user via a web site, email, or phone. Alternatively, the licensing authority may automatically install the new or modified license on device B at 534.

The messages, files, and/or ticket(s) described above may be signed and/or encrypted. More particularly, the license file, the permission ticket, and/or the rehost ticket may each be signed and/or encrypted. As a result, processing of the license file, the permission ticket, and/or rehost ticket may include decryption and/or processing of signature(s). Moreover, the generation of the license file, the permission ticket, and the rehost ticket may include the generation of signature(s) and/or encryption.

Generally, the techniques of the disclosed embodiments may be implemented on software and/or hardware. In a specific embodiment, the techniques are implemented in software. Thus, the disclosed embodiments relate to machine-readable media that include program instructions, state information (e.g., tables), etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by a computer using an interpreter.

The disclosed embodiments may be implemented on any suitable computer system. FIG. 6 illustrates a typical, general-purpose computer system 10 suitable for implementing the disclosed embodiments. The computer system may take any suitable form.

The computer system 10 may include any number of processors 62 (also referred to as central processing units, or CPUs) that may be coupled to memory devices including primary storage device 61 (typically a read only memory, or ROM) and primary storage device 65 (typically a random access memory, or RAM). As is well known in the art, ROM acts to transfer data and instructions uni-directionally to the CPUs 62, while RAM is used typically to transfer data and instructions in a bi-directional manner. Both the primary storage devices 61, 65 may include any suitable computer-readable media.

A secondary storage medium 65, which is typically a mass memory device, may also be coupled bi-directionally to CPUs 62 and provide additional data storage capacity. The mass memory device 65 may be a computer-readable medium that may be used to store programs including computer code, data, and the like. Typically, the mass memory device 65 is a storage medium such as a hard disk, which is generally slower than primary storage device(s) 61. Alternatively, the mass memory device 65 may be a storage device such as a SCSI storage device.

The CPUs 10 optionally may be coupled to a computer or telecommunications network, e.g., an internet network or an intranet network, using a network connection as shown generally at 68. With such a network connection, it is contemplated that the CPUs 62 might receive information from the network, or might output information to the network in the course of performing the above-described method steps. Thus, data may be transmitted over a network to be processed, or to be stored to or retrieved from a remote storage device. Accordingly, the disclosed embodiments may be installed for use across a network such as a local area network (LAN), a wireless network, or the Internet.

Although the foregoing embodiments have been described in some detail for purposes of clarity of understanding, it will be apparent that certain changes and modifications may be practiced within the scope of the appended claims. For instance, the disclosed embodiments need not be performed in whole or in part via a web site. As set forth above, the disclosed method steps may be performed via a variety of mechanisms. For instance, a user may receive information from the licensing authority or submit information to the licensing authority via email or phone. Moreover, those steps and/or processes performed via a web site need not be performed during the same session. Rather, the user may log on to the web site or otherwise submit information via separate sessions in order to submit various requests (e.g., to move a license, remove a license, install a license), as well as to submit a corresponding rehost ticket to the licensing authority. Moreover, although the disclosed embodiments refer to the movement of a license, the disclosed embodiments may also be used to support the movement of software. For instance, a user may submit a request to a license authority for authorization to move software from one device to another device. Therefore, the described embodiments should be taken as illustrative and not restrictive, and the described embodiments should not be limited to the details given herein but should be defined by the following claims and their full scope of equivalents.

The invention claimed is:

1. A method, comprising:
   receiving a rehost ticket indicating proof of removal of a license from a first device;
   receiving a request for a license for a second device;
   validating the rehost ticket to ensure that the license has been removed from the first device; and
   providing a license for the second device if the rehost ticket is successfully validated, wherein the license that has been removed from the first device and the license for the second device provide the same license capabilities;
   wherein the first device and the second device are associated with the same customer;
   wherein payment has been received for the license associated with the first device but payment has not been received for a separate license capable of being applied to the second device;
   wherein the method is performed by one or more processors.

2. The method as recited in claim 1, further comprising:
   receiving a request for permission to remove the license from the first device; and
   providing a permission ticket to be applied to the first device, enabling the license to be removed from the first device.

3. The method as recited in claim 2, wherein the request for permission to remove a license from the first device and the request for a license for the second device are received in a single request to move the license from the first device to the second device.

4. The method as recited in claim 2, further comprising:
   determining whether to provide the permission ticket prior to providing the permission ticket.

5. The method as recited in claim 2, further comprising:
   receiving proof of possession of the first device from a customer; and receiving proof of possession of the second device from the customer.

6. The method as recited in claim 1, wherein the license that is removed from the first device identifies the first device and the license that is provided for the second device identifies the second device.

7. The method as recited in claim 1, further comprising:
   receiving proof of possession of the license that has been previously issued and installed on the first device.

8. The method as recited in claim 1, further comprising:
   determining whether to provide a license for the second device based upon one or more business policies prior to providing the license for the second device.

9. The method as recited in claim 8, wherein determining whether to provide a license for the second device comprises:
   ascertaining whether the license capabilities are supported on a product type of the second device.

10. The method as recited in claim 8, wherein determining whether to provide a license for the second device comprises:
   ascertaining a license type of the license that has been previously issued and installed on the first device; and
   determining whether the license type can be rehosted.

11. The method as recited in claim 1, wherein receiving a rehost ticket indicating proof of removal of a license from a first device, receiving a request for a license for a second device, validating the rehost ticket, and providing a license for the second device are performed by a licensing authority.

12. The method as recited in claim 1, wherein the rehost ticket indicating proof of removal of a license from a first device and the request for a license for the second device are received via a web site.

13. The method as recited in claim 1, wherein providing a license for the second device comprises:
   providing a license for the second device via email.

14. The method as recited in claim 1, wherein providing a license for the second device comprises:
   installing a license on the second device.

15. A method, comprising:
   receiving a permission ticket by a license manager of a first device, the permission ticket indicating permission to rehost a license on the first device;
   removing the license by the license manager from the first device in response to receiving the permission ticket; and
   generating or providing a rehost ticket by the license manager, the rehost ticket indicating proof of removal of the license from the first device, thereby enabling the license to be rehosted on a second device;
   wherein the method is performed by one or more processors.

16. The method as recited in claim 15, further comprising:
   generating a temporary license by the license manager for use on the first device.

17. A computer-readable medium storing computer-executable instructions that when executed by a computer cause the computer to perform a method, the method comprising:
   receiving a permission ticket by a license manager of a first device, the permission ticket indicating permission to rehost a license on the first device;
   removing the license by the license manager from the first device in response to receiving the permission ticket; and
   generating a rehost ticket by the license manager, the rehost ticket indicating proof of removal of the license from the first device, thereby enabling the license to be rehosted on a second device; and
   providing the rehost ticket.

18. The computer-readable medium of claim 17 storing computer-executable instructions that when executed by the computer cause the computer to perform the method further comprising:
   generating a temporary license by the license manager for use on the first device.

19. A computer-readable medium storing computer-executable instructions that when executed by a computer cause the computer to perform a method, the method comprising:
   receiving a rehost ticket indicating proof of removal of a license from a first device;
   receiving a request for a license for a second device;
   validating the rehost ticket to ensure that the license has been removed from the first device;
   providing a license for the second device if the rehost ticket is successfully validated, wherein the license that has been removed from the first device and the license for the second device provide the same license capabilities;
   wherein the first device and the second device are associated with the same customer;
   wherein payment has been received for the license associated with the first device but payment has not been received for a separate license capable of being applied to the second device.

20. The computer-readable medium of claim 19 storing computer-executable instructions that when executed by the computer cause the computer to perform the method further comprising:
   receiving a request for permission to remove the license from the first device;
   providing a permission ticket to be applied to the first device, enabling the license to be removed from the first device.

21. The computer-readable medium of claim 20, wherein the request for permission to remove a license from the first device and the request for a license for the second device are received in a single request to move the license from the first device to the second device.

22. The computer-readable medium of claim 20 storing computer-executable instructions that when executed by the computer cause the computer to perform the method further comprising:
   determining whether to provide the permission ticket prior to providing the permission ticket.

23. The computer-readable medium of claim 20 storing computer-executable instructions that when executed by the computer cause the computer to perform the method further comprising:
   receiving proof of possession of the first device from a customer;
   receiving proof of possession of the second device from the customer.

24. The computer-readable medium of claim 19, wherein the license that is removed from the first device identifies the first device and the license that is provided for the second device identifies the second device.

25. The computer-readable medium of claim 19 storing computer-executable instructions that when executed by the computer cause the computer to perform the method further comprising:
   receiving proof of possession of the license that has been previously issued and installed on the first device.

26. The computer-readable medium of claim 19, wherein receiving a rehost ticket indicating proof of removal of a license from a first device, receiving a request for a license for a second device, validating the rehost ticket, and providing a license for the second device are performed by a licensing authority.

27. An apparatus comprising:
   one or more processors;
   license management logic configured to cause the one or more processors to:
      receive a permission ticket, the permission ticket indicating permission to rehost a license on the first device; remove the license from the first device in response to receiving the permission ticket; generate a rehost ticket, the rehost ticket indicating proof of removal of the license from the first device, thereby enabling the license to be rehosted on a second device; provide the rehost ticket.

28. An apparatus comprising:
   one or more processors;

license authority logic configured to cause the one or more processors to:

receive a rehost ticket indicating proof of removal of a license from a first device; receive a request for a license for a second device; validate the rehost ticket to ensure that the license has been removed from the first device; provide a license for the second device if the rehost ticket is successfully validated, wherein the license that has been removed from the first device and the license for the second device provide the same license capabilities; wherein the first device and the second device are associated with the same customer; wherein payment has been received for the license associated with the first device but payment has not been received for a separate license capable of being applied to the second device.

* * * * *